United States Patent
Clark et al.

(10) Patent No.: US 7,191,253 B1
(45) Date of Patent: Mar. 13, 2007

(54) SERVER COMPUTER SYSTEM UTILIZING AN ASYNCHRONOUS MESSAGING TECHNIQUE HAVING SEPARATE REQUEST AND RESPONSE PATHS

(75) Inventors: Douglas W. Clark, Southlake, TX (US); Richard Hathaway, Denton, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 830 days.

(21) Appl. No.: 10/254,187

(22) Filed: Sep. 25, 2002

(51) Int. Cl.
*G06F 15/16* (2006.01)
*G06F 15/173* (2006.01)

(52) U.S. Cl. ............... 709/250; 709/203; 709/226; 717/171

(58) Field of Classification Search ............ 709/201, 709/203, 223, 224, 225, 226, 250; 717/171
See application file for complete search history.

(56) References Cited

U.S. PATENT DOCUMENTS

| | | | |
|---|---|---|---|
| 16,867 A * | 3/1857 | Kampe et al. ............... 709/318 |
| 91,881 A * | 6/1869 | Laymann et al. ............... 710/4 |
| 102,999 A * | 5/1870 | Mggenti et al. ............. 455/518 |
| 6,289,382 B1 * | 9/2001 | Bowman-Amuah ......... 709/226 |
| 6,842,906 B1 * | 1/2005 | Bowman-Amuah ......... 719/330 |
| 6,889,231 B1 * | 5/2005 | Souder et al. ............ 707/104.1 |
| 6,918,051 B2 * | 7/2005 | Block et al. .................... 714/4 |

* cited by examiner

*Primary Examiner*—Ario Etienne
*Assistant Examiner*—El Hadji M. Sail

(57) ABSTRACT

A distributed processing environment includes a mainframe computer system having a plurality of processing sub-spaces. An asynchronous messaging service resides in each of the processing sub-spaces. Additionally, a server process application resides in a first one of the processing sub-spaces while an instance of a handler application resides in each one of the remaining processing sub-spaces. A client computer system issues a request message to the asynchronous messaging service residing in the first processing sub-space. If the server process application requires the services of the handler application to handle the request message, the server process application passes the request to an instance of the handler application selected using a load balancing algorithm. After processing the received request, the handler application returns a response to the request to the requesting client computer system via the asynchronous messaging service application residing with it in one of the processing sub-spaces.

17 Claims, 2 Drawing Sheets

SERVER COMPUTER SYSTEM UTILIZING AN ASYNCHRONOUS MESSAGING TECHNIQUE HAVING SEPARATE REQUEST AND RESPONSE PATHS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a server computer system utilizing an asynchronous messaging techniques having separate request and response paths between a messaging server issuing a request on behalf of a client process application and an instance of a handling application, residing within the server computer system, which handles the request. By returning the response to the messaging server along a response path separate and discrete from the request path, the server computer system is capable of handling a greater number of requests from client computer systems thereof.

BACKGROUND OF THE INVENTION

In a computer network, plural computer systems are joined together to exchange information and share resources. Thus, a computer network is a distributed computing environment in which networked computer systems provide users with the capabilities of access to distributed resources, for example, remote files and databases or remote printers, and to distributed processing, for example, where an application is processed on two or more computer systems. In such a distributed computing environment, the components of an application may reside on different machines but work together. For example, each work station in a computer network often provides a user interface and local analysis and data processing, while larger, host computers, for example, a file server or mainframe, may maintain a large set of data files, coordinate access to large databases and perform larger scale data processing.

In a distributed processing environment, each application or process must be able to communicate and exchange information with other applications or processes in the environment. Currently, many inter-application or inter-process exchanges are performed using a messaging technique commonly referred to as message queuing. In message queuing, a first (or "client") process passes a message to request processing by a second (or "server") process. The messages are queued at the server process to await handling thereby. In turn, the server process returns an alert when the results are ready. One message oriented middleware product which uses a message queuing messaging technique to enable processes to communicate and exchange information in a distributed computing environment is known as MQ Series messaging software and is commercially available through International Business Machines Corporation of Armonk, N.Y.

Oftentimes, the server process does not actually handle a request received from the client process. Rather, in a number of distributed computing environments, the server process application forwards the request to a separate application, commonly known as a handler application, for handling. While the use of handler applications enables selected functionality to be offloaded the server process application, handler applications may also slow the response time of the server process application, thereby decreasing the number of requests which the server process application may handle in any given time period. It should be readily appreciated that a wide variety of benefits may be derived by increasing the number of requests which can be handled by the server process application in any given time period. Accordingly, it is an object of the invention to enhance the ability of the server process application to handle such requests.

SUMMARY OF THE INVENTION

In one embodiment, the present invention is directed to a server computer system which includes an asynchronous messaging service application residing in a first processing sub-space thereof and an asynchronous messaging service application and a handler application residing in a second processing sub-space thereof. Requests for the handler application are transmitted to the asynchronous messaging service application residing in the first processing sub-space while responses to the requests for the handler application are returned by the asynchronous messaging service application residing in the second processing sub-space. In certain further aspects thereof, the asynchronous messaging service residing in the first processing sub-space serves as a first front end of the server computer system which handles incoming messages to the server computer system. In others, the asynchronous messaging service residing in the second processing sub-space serves as a second front end of the server computer system which handles outgoing messages for the server computer system.

In another embodiment, the present invention is directed to a server computer system having a processing space comprised of first and second processing sub-spaces. Residing in the first processing sub-space are an asynchronous messaging service application and a server process application while residing in the second processing sub-space are an asynchronous messaging service application and a handler application. A client computer system issues a request message to the asynchronous messaging service residing in the first processing sub-space. If the server process application requires the services of the handler application to handle the request message, the server process application passes the request to the handler application. After processing the received request, the handler application returns a response to the request to the requesting client computer system via the asynchronous messaging service application residing in the second processing sub-space. In one aspect thereof, the asynchronous messaging service residing in the first processing sub-space serves as a first front end of the server computer system which handles incoming messages to the server computer system. In another, the asynchronous messaging service residing in the second processing sub-space serves as a second front end of the server computer system which handles outgoing messages for the server computer system. In still another, the server computer system is a mainframe system.

In still another embodiment, the present invention is directed to a server computer system having a processing space in which a first asynchronous messaging service, a second asynchronous messaging service, a service process application and a plurality of instances of a handler application reside. A client computer system transmits request messages to the server process application via the first asynchronous messaging service application. If the server process application requires the services of the handler application to handle the request message, the server process application will pass the request to a selected instance of the handler application. The selected instance of the handler application will then return a response to the requesting client computer system via the second asynchronous messaging service application. In one aspect thereof, the server process application further includes a load balancing algorithm for evenly distributing request messages amongst the plurality of instances of the handler application. In another, the server computer system further includes a data store for maintaining a table associating each one of the plurality of instances of the handler application with a range of time values. In this aspect, the load balancing algorithm will first determine an arrival time for each message requiring the services of the handler application and then select, from amongst the plurality of instances of the handler application, an instance of the handler application having a range of time values within which the arrival time falls.

In still another aspect of this embodiment of the invention, the server computer system further includes a plurality of second asynchronous messaging services, each corresponding to one of the plurality of instances of the handler application. In yet another, further, aspect thereof, the processing space may be comprised of a primary processing sub-space in which the first asynchronous messaging service and the server process application reside and a plurality of secondary processing sub-spaces. On each one of the plurality of secondary processing sub-spaces, an instance of the handler application and the second asynchronous messaging service corresponding to that instance of the handler application reside. In still others, the server process application may further include a load balancing algorithm for evenly distributing request messages amongst the plurality of instances of the handler application and/or the server computer system may include a data store for maintaining a table associating each one of the plurality of instances of the handler application with a range of time values. If the server computer system includes a data store, the load balancing algorithm would determine an arrival time for each message requiring the services of the handler application and subsequently select, from amongst the plurality of instances of the handler application, an instance of the handler application having a range of values within which the arrival time falls.

DETAILED DESCRIPTION OF THE INVENTION

Figure 1:
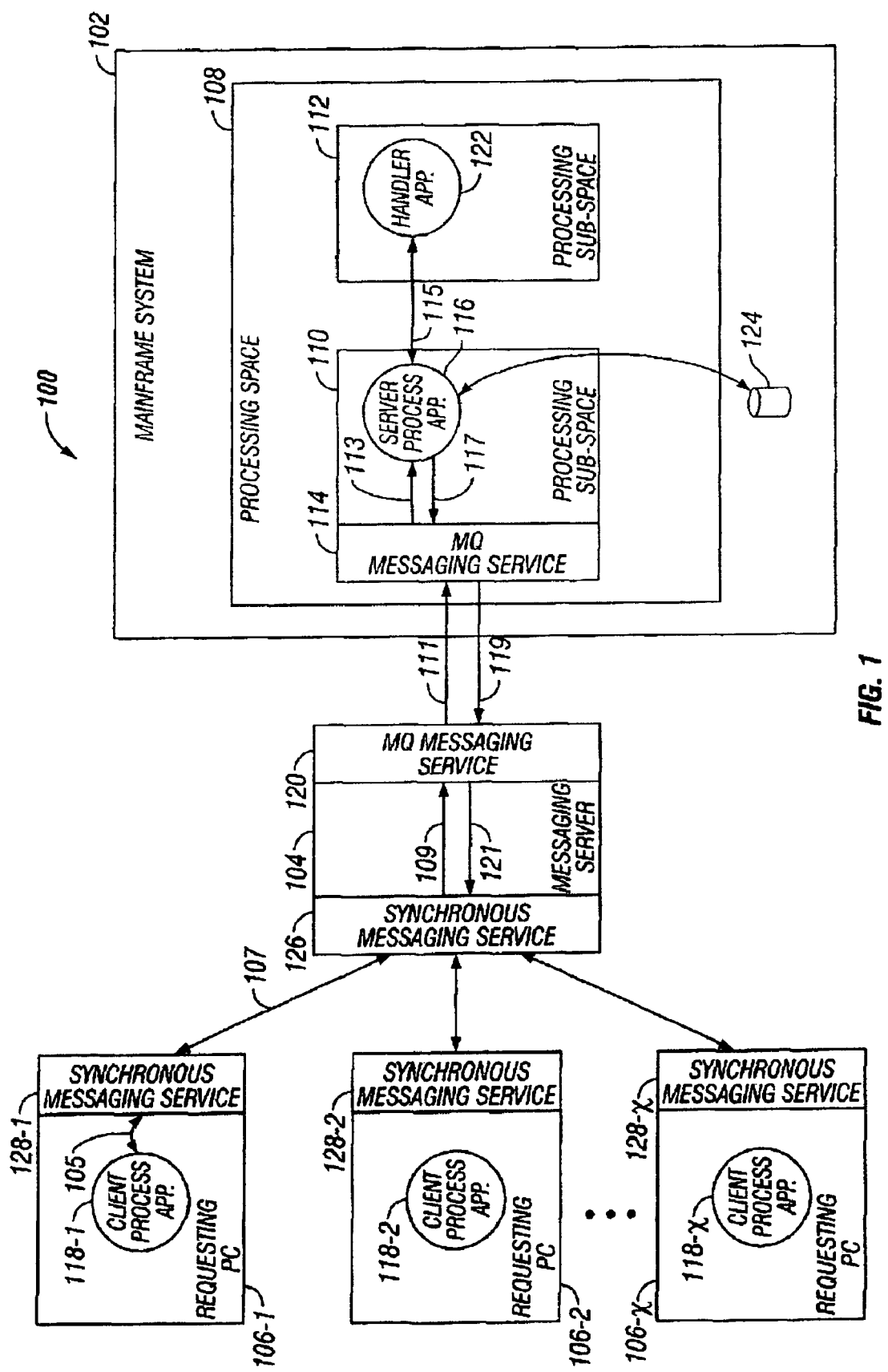
FIG. 1 is a block diagram of a first, conventionally configured, distributed computing environment.

Referring now to FIG. 1, a conventionally configured distributed computing environment 100, for example, a computer network, may now be seen. The distributed computing environment 100 is comprised of a first computer system 102 coupled to a second computer system 104 by a first communication link (not shown) and plural third computer systems 106-1 through 106-x, each coupled to the second computer system 104 by respective ones of plural second communication links (also not shown). By way of example, the first computer system 102 is a mainframe computer system, the second computer system 104 is a mid-range server computer system and each one of the third computer systems 106-1 through 106-x is a personal computer ("PC"). It is fully contemplated, however, that the distributed computing environment 100 may include any number of additional computer systems of one or more of the computer system types illustrated herein. For example, in a typical distributed computing processing environment, the mainframe computer system would be coupled to plural mid-range server computer systems, interconnected to one another in a ring topology, with plural PCs coupled to each mid-range server computer system forming part of the ring.

As illustrated herein, the mainframe computer system 102 has been greatly simplified and various components thereof not necessary for an understanding of the present invention have been omitted therefrom. The mainframe computer system 102 includes a processing space 108 which is hereby defined as encompassing the collective processing capability of the processor subsystem (not shown) of the mainframe computer system 102. In turn, the processing space 108 is divided into plural processing sub-spaces, in each of which discrete functionality for the mainframe computer system 102 resides. For purposes of illustration, FIG. 1 shows the processing space 108 as including a first processing sub-space 110 and a second processing sub-space 112. However, it should be clearly understood that the processing space 108 may be configured to include any number of processing sub-spaces.

Residing within each one of the first and second processing sub-spaces 110 and 112 are one or more software applications, each comprised of a series of instructions which are encoded in a memory subsystem (not shown) of the mainframe computer system 102 as computer readable program code and executable by the processor subsystem of the mainframe computer system 102. More specifically, residing within the first processor sub-space 110 is an asynchronous messaging service application 114, preferably, a queue-based asynchronous messaging service application. For example, the MQ messaging service is a queue-based asynchronous messaging service application suitable for the purposes contemplated herein. Also residing within the first processor sub-space 110 is a server process application 116 for which the mid-range server system 104 may issue requests thereto in a manner to be more fully described below. Briefly, however, the asynchronous messaging service application 114 enables messages originating at a client process application residing on a requesting client computer system, for example, a client process application 118-1 residing on the PC 106-1, to be directed to the server process application 116 residing on the mainframe computer system 102. The asynchronous messaging service application 114 further enables replies from the server process application 116 residing on the mainframe computer system 102, to be returned towards the client process application 118-1 residing on the PC 106-1.

Residing within the second processing sub-space 112 is a handler application 122. Typically, the handler application 122, which is often referred to in the art as a service, is a software application, for example, a subroutine, that the server process application 116 calls in order to process a request received from a client process application. Similar to the server process application 116, the handler application 122 is comprised of a series of instructions encoded in the memory subsystem of the mainframe computer system 102 as computer readable program code and executable by the processor subsystem of the mainframe computer system 102. While a single handler application, specifically, the handler application 122, is shown as residing within the second processing sub-space 112, it should be clearly understood that plural handler applications typically reside within the processing space 108 of the mainframe computer system 102. In various embodiments thereof, such further handler applications may reside within the first processing sub-space 110, the second processing sub-space 112 or another processing sub-space not shown in FIG. 1. Finally, as will be more fully described below, data store 124, which forms a portion of the memory subsystem of the mainframe system 102, enables the server process application 116 to establish a link with the handler application 122 so that the handler application 122 may execute on behalf of the server process application 116.

As illustrated herein, the mid-range server computer system 104 acts as a messaging server computer system to transfer request messages originating at a client process application residing on a requesting PC, for example, a client process application 118-1 residing on requesting PC 106-1, to the server process application 116 residing on the mainframe computer system 102. To function as a messaging server computer system, both an asynchronous messaging service 120 and a synchronous messaging service 126 reside on the mid-range server computer system 104. The exchange of messages between the mid-range server computer system 104 and the mainframe computer system 102 is handled by a suitably configured queue-based messaging system such as the MQ series messaging system. Such a queue-based messaging system is comprised of a first messaging application, for example, the MQ messaging service 114, which handles messages for the server process application 116 and a second messaging application, for example, the MQ messaging service 120, which handles messages for the synchronous messaging service 126 (which acts on behalf of the client process application). Together, the MQ messaging services 114 and 120 enable request messages originating at a client process application, for example, the client process application 118-1, and arriving from the synchronous messaging service 126 to be transferred to the server process application 116. Further, the MQ messaging services 114 and 120 collectively enable reply messages to be transferred from the server process application 116 to the synchronous messaging service 126 on the way to their destination, the client process application 118-1. Finally, residing on each one of the requesting PCs 106-1 through 106-x are a client process application 118-1 through 118-x and a synchronous messaging service 128-1 through 128-x. As will be more fully described below, the client process applications 118-1 through 118-x generate request messages while the corresponding one of the synchronous messaging services 128-1 through 128-x attend to the transfer of the generated messages to the messaging server computer system 104.

Continuing to refer to FIG. 1, the method by which messages are exchanged between a client process application residing on a requesting PC, for example, the client process application 118-1 residing on the requesting PC 106-1, and the server process application 116 will now be described in greater detail. A request message is generated by the client process application 118-1 is first passed to the synchronous messaging service 128-1 over synchronous link 105. In turn, the synchronous messaging service 128-1 attends to the transfer of the request message from the requesting PC 106-1 to the messaging server computer system 104 along synchronous link 107. Once arriving at the messaging server computer system 104, the request message is passed from the synchronous messaging service 126 to the MQ messaging service 120 along asynchronous link 109. The MQ messaging service 120 then attends to the transfer of the request message from the messaging server computer system 104 to the mainframe computer system 102 along asynchronous link 111. Once arriving at the mainframe computer system 102, the request message is retrieved, from the MQ messaging service 114, along asynchronous link 113, by the server process application 116. The server process application 116 then handles the request message retrieved from the MQ messaging service 114.

Oftentimes, the server process application 116 must invoke another service, for example, the handler application 122, to handle the request message. Accordingly, upon retrieving the request message from the MQ messaging service 114, the server process application 116 parses the message to determine the name of the service which must be invoked in order to handle the request message. Once the server process application 116 has determined the name of the service, the server process application reads a table or other arrangement of information maintained within the data store 124 to determine the transaction associated with the named service. By executing the transaction, a synchronous link 115 is established between the server process application 116 and the handler application 122. The link 115 allows the message to be passed from the server process application 116 to the handler application 122. When the handler application 122 completes processing of the request message, the handler application 122 constructs a response message containing the results of the processing of the request message. The handler application 122 then returns the response message to the service process application 116, again over the synchronous link 115 established between the server process application 116 and the handler application 122.

Upon return of the results to the server process application 116, the synchronous link 115 between the server process application 116 and the handler application 122 is released. The server process application 116 then forwards the response message to the MQ messaging service 114 along asynchronous link 117. The MQ messaging service 114 attends to transmission of the response message to the MQ messaging service 120 along asynchronous link 119. Within the messaging server computer system 104, the response message is passed from the MQ messaging service 120 to the synchronous messaging service 126 along asynchronous link 121. Finally, the synchronous messaging service 126 attends to transmission of the response message to the synchronous messaging service 128-1 of the requesting PC 106-1, again over synchronous link 107. Once the response message has arrived at the synchronous messaging service 128-1, the client process application 118-1 obtains the response message from the synchronous messaging service 128-1, again over synchronous link 105.

From the foregoing description, the difference between synchronous and asynchronous processing, for example, the difference between synchronous and asynchronous processing of a request message, by a handler application, on behalf of a server process, application should be appreciated. When a request is processed synchronously, the server process application must await determination of the result and the link over which the request message was issued must be maintained until the response message containing the results of the processing of the request is returned over that link. In asynchronous processing, however, the server process application need not await determination of the result. Accordingly, the link over which the request was issued may be released after transfer of the request message to the handler application is complete.

Heretofore, mainframe computer systems such as the mainframe computer system 102 have been exclusively configured to synchronously process request messages. As a result, the ability of the mainframe computer system 102 to handle plural request messages has been limited unnecessarily. More specifically, the mainframe computer system 102 can only establish a limited number of links between the server process application 116 and services, handler applications, or other resources, for example, the aforedescribed synchronous link 115 between the server process application 116 and the handler application 122. When the mainframe computer system 102 has reached this limit, any subsequently arriving message must remain queued at the server process application 116 to await release of a previously established link. Such a situation may result in underutilization of the resources of the mainframe computer system 102. For example, if the other resources to which links have been established use considerable time processing the data contained in requests transmitted over those links, other resources which are available to handle subsequently arriving messages may remain unused because links to the unused resources cannot be established.

The transfer of messages to and/or from conventionally configured mainframes such as the mainframe computer system 102 have been further limited by the use of a single "front end" for the mainframe computer system 102. As previously set forth, the processing space 108 of the mainframe computer system 102 may be viewed as being comprised of plural processing sub-spaces, of which two such processing sub-spaces, specifically, the first processing sub-space 110 and the second processing sub-space, are illustrated in FIG. 1. Traditionally, only one such processing sub-space, here, the processing sub-space 110, has had an asynchronous messaging service, here, the MQ messaging service 114, residing therein. All messages destined to/originating from the mainframe computer system 102 are received by/issued from the MQ messaging service 114. Thus, the MQ messaging service 114 (or another asynchronous messaging service performing the aforementioned functions for the mainframe computer system 102) has often been termed as the "front end" of the mainframe computer system. However, the use of a messaging service in this manner produces a choke point where messages may be delayed as traffic becomes increasingly heavy.

The foregoing deficiencies in conventionally configured mainframe computer systems have been overcome by the present invention of a mainframe computer subsystem uniquely configured to: (1) asynchronously link to the resources used to generate responses to requests; and (2) return the generated response along paths separate and discrete from the paths along which the requests were received. Such a mainframe computer system may be seen by reference to FIG. 2. As may now be seen, a distributed computing environment 200 is comprised of a first computer system 202 coupled to a second computer system 204 by a first communication link (not shown) and plural third computer systems 206-1 through 206-x, each coupled to the second computer system 204 by a respective one of plural second communication links (also not shown). By way of example, the first computer system 202 is a mainframe computer system, the second computer system 204 is a mid-range server computer system and each one of the third computer systems 206-1 through 106-x are PCs. It is fully contemplated, however, that the distributed computing environment 200 may include any number of additional computer systems of one or more of the computer systems types illustrated herein. For example, in a typical distributed computing processing environment, the mainframe computer system 200 would be coupled to plural mid-range server computer systems 204, interconnected to one another in a ring topology, with plural PCs 206-1 through 206-x coupled to each mid-range server computer system 204 forming part of the ring.

As before, the mainframe computer system 202 has been greatly simplified and various components thereof not necessary for an understanding of the present invention have been omitted therefrom. The mainframe computer system 202 includes a processing space 208 which encompasses the collective processing capability of the processor subsystem of the mainframe computer system 202. In turn, the processing space 208 is divided into plural processing sub-spaces, in each of which discrete functionality for the mainframe computer system 102 resides. For purposes of illustration, FIG. 1 shows the processing space 208 as including a first processing sub-space 210. a second processing sub-space 211, a third processing sub-space 212 and a fourth processing sub-space 213. However, it should be clearly understood that the processing space 208 may be configured to include any number of processing sub-spaces.

Residing within each one of the first, second, third and fourth processor sub-spaces 210, 211, 212 and 213 are one or more software applications, each comprised of a series of instructions which are encoded in a memory subsystem (not shown) of the mainframe computer system 202 as computer readable program code and executable by the processor subsystem of the mainframe computer system 202. More specifically, residing within each one of the first, second, third and fourth processor sub-spaces 210, 211, 212 and 213 is a respective instance 215, 216, 217 and 218 of an asynchronous messaging service application, preferably a queue-based asynchronous messaging service application. As before, the MQ messaging service is a queue-based asynchronous messaging service application suitable for the purposes contemplated herein. Also residing within the first processor sub-space 210 is a server process application 220. Like the instances 215, 216, 217 and 218 of the MQ messaging service, the server process application 220 is comprised of a series of instructions encoded in the memory subsystem of the mainframe computer system 202 as computer readable program code and executable by the processor subsystem of the mainframe computer system 202. As will be more fully described below, the server process application 220 receives request issued by the mid-range server system 204 and queued, within the mainframe computer system 202, by the instance 215 of the MQ messaging service.

Residing on each one of the second, third and fourth processor sub-spaces 211, 212 and 213 is a respective instance 222, 224 and 226 of handler application "A". Again, each instance 222, 224 and 226 of the handler application "A" is comprised of a series of instructions encoded in the memory subsystem of the mainframe computer system 202 as computer readable code and executable by the processor subsystem of the mainframe computer system 202. Of course, while plural instances 222, 224 and 226 of a single handler application, specifically, the handler application "A", is shown as residing within each one of the second, third and fourth processing sub-spaces 211, 212 and 213, respectively, it should be clearly understood that it is fully contemplated that plural handler applications may reside within the processing space 208 of the mainframe computer system 202. In various embodiments thereof, such further handler applications may reside within the first processing sub-space 210, the second processing sub-space 211, the third processing sub-space 212, the fourth processing sub-space 213 or another processing sub-space (not shown in FIG. 2) of the processing space 208. Furthermore, each such further handler application may have either a single instance thereof or plural instances thereof residing within the processing space 208.

It should be further understood that neither the plural instances of the handler application "A" nor the plural instances of any further handler applications need be evenly distributed amongst the processing sub-spaces in which handler applications reside. For example, in the embodiment of the invention illustrated in FIG. 2, the plural instances 222, 224 and 226 of the handler application "A" are evenly distributed amongst the processing sub-spaces 211, 212 and 213 in which at least one handler application resides. In other words, a single instance of the handler application "A" resides in each processing sub-space having one or more handler applications residing therein. It is fully contemplated, however, that plural instances of a handler application may be unevenly distributed amongst the processing sub-spaces in which at least one handler application resides. For example, an uneven distribution of the handler application "A" would occur if an instance thereof resided in the processing sub-space 211 and the processing sub-space 212 but not the processing sub-space 213.

As disclosed herein, each one of the first, second, third and fourth processing sub-spaces 210, 211, 212 and 213 has an instance of an asynchronous messaging service, specifically, the instances 215, 216, 217 and 218, respectively, of the MQ messaging service, residing therein. Each of the aforementioned instances may receive messages from and/or sent messages to the MQ messaging service 228. Thus, each one of the instances 215, 216, 217 and 218 may be deemed as a front end for the mainframe system 202. While it is contemplated that any number of the processing sub-spaces which collectively comprise the processing space 208 may have an instance of the MQ messaging service residing therein, it is preferred that instances of the MQ messaging service reside only in those processing sub-spaces in which either a server process application or a handler application resides. Thus, in the embodiment illustrated in FIG. 2, an instance of the MQ messaging service resides in each one of the first, second, third and fourth processing sub-spaces 210, 211, 212 and 213.

The mainframe computer system 202 further includes a first data store 240 and a second data store 250. As will be more fully described below, the first data store 240, which forms a first portion of the memory subsystem of the mainframe computer system 202, enables the server process application 220 to establish a link with a selected instance, for example, the instance 224, of the handler application "A" so that the selected instance of the handler application may execute a request on behalf of the server process application 220. Conversely, the second data store 250, which forms a second portion of the memory subsystem of the mainframe computer system 202, enables the server process application 220 to select, from amongst the plural instances 222, 224 and 226 of the handler application "A", which instance is to receive the request. Of course, rather than having the server process application 220 select from amongst the plural instances of the handler application "A", in an alternate embodiment of the invention, it is contemplated that a discrete application, residing in either the first processing sub-space 210 or another processing sub-space of the processing space 208 and coupled to the server process application 220, may select, on behalf of the server process application 220, from amongst the plural instances of the handler application "A".

Figure 2:
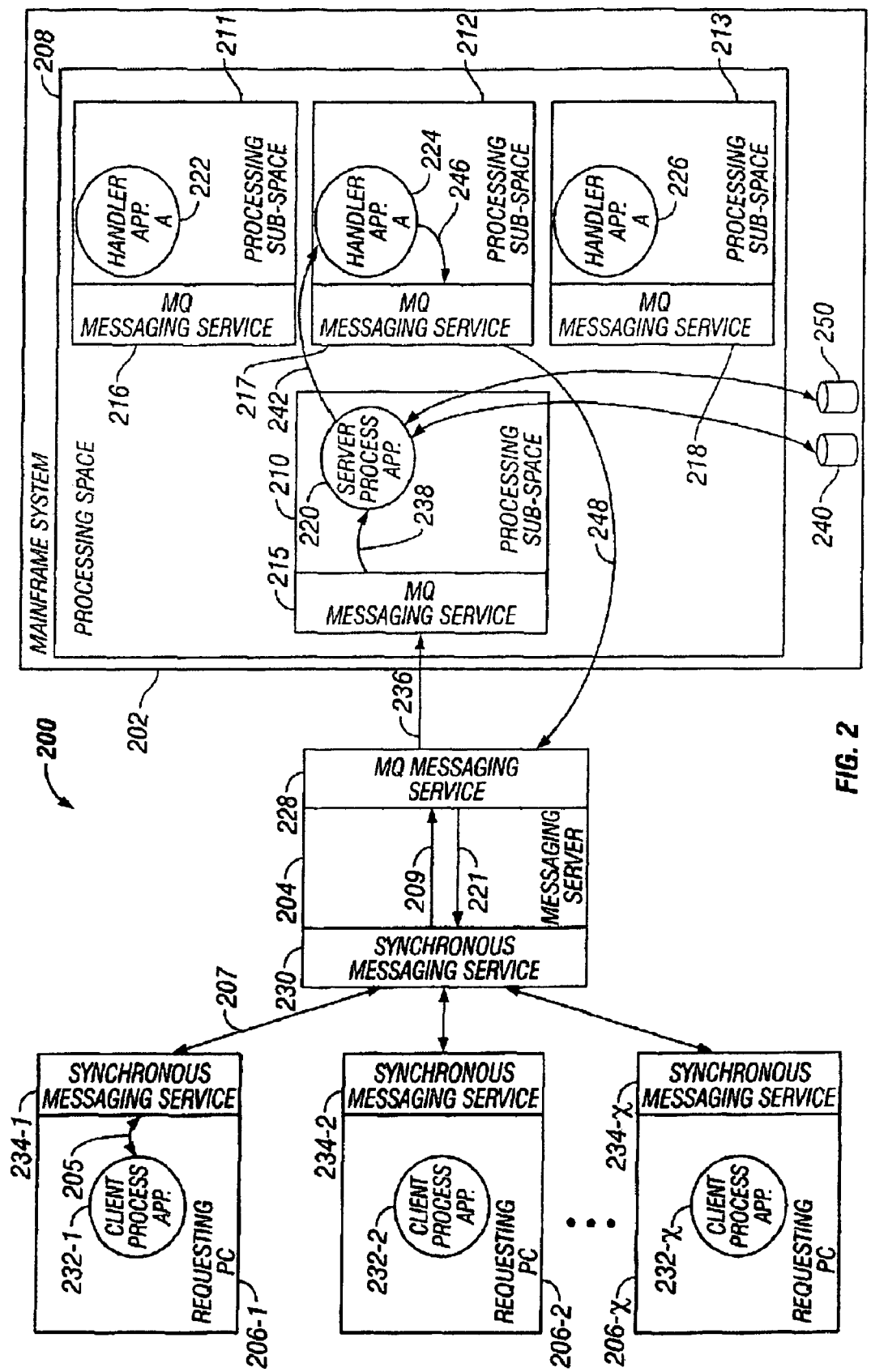
FIG. 2 is a block diagram of a second distributed computing environment which includes a server computer system constructed in accordance with the teachings of the present invention.

Continuing to refer to FIG. 2, the mid-range server computer system 204 acts as a messaging server computer system to transfer request messages originating at a client process application residing on a requesting PC, for example, client process application 232-1 residing on requesting PC 206-1, to the server process application 220 residing on the mainframe computer system 202. To function as a messaging server computer system, both an asynchronous messaging service 228 and a synchronous messaging service 230 reside on the mid-range server computer system 204. Finally, residing on each one of the requesting PCs 206-1 through 206-x are a client process application 232-1 through 232-x and a synchronous messaging service 234-1 through 234-x. As will be more fully described below, the client process applications 232-1 through 232-x generate request messages while the corresponding one of the synchronous messaging services 234-1 through 234-x attend to the transfer of the generated messages to the messaging server computer system 204.

The method by which messages are exchanged between a client process application, for example, the client process application 232-1 residing on the requesting PC 206-1, and the server process application 220 will now be described in greater detail. A request message generated by the client process application 232-1 is first passed to the synchronous messaging service 234-1 via synchronous link 205. In turn, the synchronous messaging service 234-1 attends to the transfer of the request message from the requesting PC 206-1 to the messaging server computer system 204 along synchronous link 207. Once arriving at the messaging server computer system 204, the request message is passed from the synchronous messaging service 230 to the MQ messaging service 228 along asynchronous link 209. The MQ messaging service 228 then attends to the transfer of the request message from the messaging server computer system 204 to the mainframe computer system 202 along asynchronous link 236. Once arriving at the mainframe computer system 202, the request message is retrieved, from the MQ messaging service 215 by the server process application 220 along asynchronous link 238.

The server process application 220 then handles the request message retrieved from the MQ messaging service 215. Oftentimes, the server process application 220 must invoke another service, for example, the handler application "A", to handle the request message. Accordingly, upon retrieving the request message from the MQ messaging service 215, the server process application 220 parses the message to determine the name of the service which must be invoked in order to handle the request message. Once the server process application 220 has determined the name of the handler application, the server process application 220 reads a table or other arrangement of information maintained within the data store 240 to determine the transaction associated with the named handler application.

Before executing the transaction, however, the server process application 220 must first determine to which instance of the handler application the message is to be passed. To do so, a load balancing algorithm is executed. In the embodiment of the invention disclosed herein, the load balancing algorithm resides within, and forms part of the server process application 220. Alternately, however, the load balancing algorithm may form part of a discrete application residing within either the first processing sub-space 210 or another processing sub-space of the processing space 208. If configured as part of a discrete application, the load balancing algorithm would be called by the server process application prior to executing each transaction.

To determine to which instance of a handler application the message is to be passed, the server process application 220 would first determine the time at which the message was received from the MQ messaging service 215. For example, the server process application 220 may check a time stamp field of the received message. After determining the time at which the message was received, the server process application 220 would determine which instance of the handler application is to received the message. For example, if the message is to be delivered to the handler application "A", the server process application 220 must determine whether to forward the message to the first instance 222 of the handler application "A" residing in the second processing sub-space 211, the second instance 224 of the handler application "A" residing in the third processing sub-space 212 or the third instance of the handler application "A" residing in the fourth processing sub-space 213.

To do so, the server process application 220 checks the contents of the data store 250. For each handler application residing in the processing space 208, the data store 250 maintains a data file (not shown). Each such data file contains a list of the instances of that handler application residing in the processing space 208 and a set of values of the seconds unit of the message arrival time which are assigned to each instance. While differently sized value sets may be assigned to each instance of the handler application, to achieve load balancing, it is preferred that each instance of a particular handler application be assigned similarly sized value sets. For example, if only a single instance of a handler application resides in the processing space 208, that instance would be assigned the arrival time values 0 to 60 seconds. Similarly, if two instances of a handler application reside in the processing space 208, the first instance would be assigned the arrival time values 0 to 30 seconds and the second instance would be assigned the arrival time values 31 to 60 seconds while, if three instances of a handler application reside in the processing space, the first instance would be assigned the arrival time values 0 to 20 seconds, the second instance would be assigned the arrival time values 21 to 40 seconds and the third instance would be assigned the arrival time values 41 to 60 seconds. Arrival time value assignments for instances of handler applications having even greater numbers of instances residing in the processor space 208 may be determined in a similar manner.

By checking the data file associated with the handler application to which the message is to be delivered, the server process application 220 determines the arrival time values assigned to each instance of the handler application. The server process application 220 then compares the seconds unit of the arrival time to the arrival time values assigned to each instance of the handler application to determine which instance of the handler application "A" is to receive the message. For example, if the first instance 222 of the handler application "A" is assigned the arrival time values 0–20 seconds, the second instance 224 of the handler application "A" is assigned the arrival time values 21–40 seconds and the third instance 226 of the handler application "A" is assigned the arrival time values 41–60 seconds and the seconds unit of the arrival time of the message is 30 seconds, the server process application 220 will determine that the message is to be delivered to the second instance 224 of the handler application "A".

Upon determining which instance of the handler application is to receive the message, an asynchronous link 242 is established between the server process application 220 and the second instance 224 of the handler application "A". The asynchronous link 242 allows the message to be passed from the server process application 220 to the second instance 224 of the handler application "A". Upon arrival of the message at the second instance 224 of the handler application "A", the asynchronous link 242 may be released. The second instance 224 of the handler application "A" may then continue processing of the message without tying up any of the limited number of links which may be established within the processing space 208.

When the second instance 224 of the handler application "A" completes processing of the request message, a response message containing the results of the processing of the request and the response message is forwarded to MQ messaging service 217, which, like the second instance 224 of the handler application "A", resides in the third processing space 212, over asynchronous link 246. In turn, the MQ messaging service 217 attends to transmission of the response message to the MQ messaging service 228 over asynchronous link 248. Within the messaging server computer system 204, the response message is passed from the MQ messaging service 228 to the synchronous messaging service 230 over asynchronous link 221. Finally, the synchronous messaging service 230 attends to transmission of the response message to the synchronous messaging service 234-1 of the requesting PC 206-1 over synchronous link 207. Once the response message has arrived at the synchronous messaging service 234-1, the client process application 232-1 obtains the response message from the synchronous messaging service 234-1 over synchronous link 205.

Thus, there has been described and illustrated herein, a server computer system which employs an asynchronous messaging techniques having separate request and response paths between a messaging server issuing a request on behalf of a client process application and an instance of a handling application, residing within the server computer system, which handles the request. By returning the response to the messaging server along a response path separate and discrete from the request path, the server computer system is capable of handling a greater number of requests from client computer systems thereof. However, those skilled in the art should recognize that numerous modifications and variations may be made in the techniques disclosed herein without departing substantially from the spirit and scope of the invention. Accordingly, the scope of the invention should only be defined by the claims appended hereto.

The invention claimed is:

1. An enterprise network of computer systems comprising client computer systems and at least one client messaging service in communication with said client computer systems and comprising a server computer system suitable for use in a distributed processing environment, said server computer system comprising:

a processing space comprised of a first processing sub-space and a second processing sub-space;

said first processing sub-space having an asynchronous messaging service residing therein;

said second processing sub-space having an asynchronous messaging service and a handler application residing therein;

wherein requests for said handler application are transmitted, by said client computer systems by way of said client messaging service application, to said asynchronous messaging service residing in said first processing sub-space, said asynchronous messaging service in said first processing sub-space transmitting said requests to said handler in said second processing space, and responses to said requests for said handler application are returned, by said asynchronous messaging service residing in said second processing sub-space, to said at least one client messaging service and to said requesting client computer systems bypassing said synchronous messaging service residing in said first processing sub-space.

2. The server computer system of claim 1, wherein said asynchronous messaging service residing in said first processing sub-space serves as a first front end of said server computer system.

3. The server computer system of claim 2, wherein said first front end of said server computer system handles incoming messages to said server computer system.

4. The server computer system of claim 3, wherein said asynchronous messaging service residing in said second processing sub-space serves as a second front end of said server computer system.

5. The server computer system of claim 4, wherein said second front end of said server computer system handles outgoing messages for said server computer system.

6. The server computer system of claim 5, wherein said server computer system is a mainframe computer system.

7. A server computer system suitable for use in a distributed processing environment, said server computer system comprising:
 a processing space comprised of a first processing sub-space and a second processing sub-space;
 said first processing sub-space having an asynchronous messaging service and a server process application residing therein;
 said second processing sub-space having an asynchronous messaging service and a handler application residing therein;
 wherein a request message for said server process application is transmitted, by a client computer system, to said server process application via said asynchronous messaging service residing in said first processing sub-space;
 wherein, if said server process application requires the services of said handler application to handle said request message, said server process application passing said request to said handler application; and
 wherein said handler application returns a response to said request to said requesting client computer system via said asynchronous messaging service residing in said second processing sub-space, bypassing said asynchronous messaging service residing in said first processing sub-space.

8. The server computer system of claim 7, wherein said asynchronous messaging service residing in said first processing sub-space serves as a first front end of said server computer system.

9. The server computer system of claim 8, wherein said asynchronous messaging service residing in said second processing sub-space serves as a second front end of said server computer system.

10. The server computer system of claim 9, wherein said server computer system is a mainframe computer system.

11. A server computer system suitable for use in a distributed processing environment, said server computer system comprising:
 a processing space in which a first asynchronous messaging service, a second asynchronous messaging service, a service process application and a plurality of instances of a handler application reside;
 wherein a request message for said server process application is transmitted, by a client computer system, to said server process application via said first asynchronous messaging service;
 wherein, if said server process application requires the services of said handler application to handle said request message, said server process application passing said request to a selected instance of said handler application; and
 wherein said selected instance of said handler application returns a response to said request to said requesting client computer system via said second asynchronous messaging service, bypassing said server process application and said first asynchronous messaging service.

12. The server computer system of claim 11, where said server process application further comprises a load balancing algorithm for evenly distributing request messages amongst said plurality of instances of said handler application.

13. The server computer system of claim 12, and further comprising:
 a data store for maintaining a table associating each one of said plurality of instances of said handler application with a range of time values;
 said load balancing algorithm determining an arrival time for each message requiring the services of said handler application and selecting, from amongst said plurality of instances of said handler application, an instance of said handler application having a range of time values within which said arrival time falls.

14. The server computer system of claim 11, and further comprising a plurality of instances of a second asynchronous messaging service, each one of said plurality of instances of said second asynchronous messaging service corresponding to one of said plurality of instances of said handler application.

15. The server computer system of claim 14 wherein said processing space further comprises:
 a primary processing sub-space in which said first asynchronous messaging service and said server process application reside;
 a plurality of secondary processing sub-spaces, one of said plurality of instances of said handler application and one of said plurality of instances of said second asynchronous messaging service which corresponds to said one of said plurality of instances of said handler application residing in each one of said plurality of secondary processing sub-spaces.

16. The server computer system of claim 15, where said server process application further comprises a load balancing algorithm for evenly distributing request messages amongst said plurality of instances of said handler application.

17. The server computer system of claim 16, and further comprising:
 a data store for maintaining a table associating each one of said plurality of instances of said handler application with a range of time values;
 said load balancing algorithm determining an arrival time for each message requiring the services of said handler application and selecting, from amongst said plurality of instances of said handler application, an instance of said handler application for which said range of values within which said arrival time falls.

* * * * *